Feb. 25, 1930.   S. N. COATES   1,748,208
DOWN DRAFT HEATER
Filed Nov. 7, 1928   2 Sheets-Sheet 1
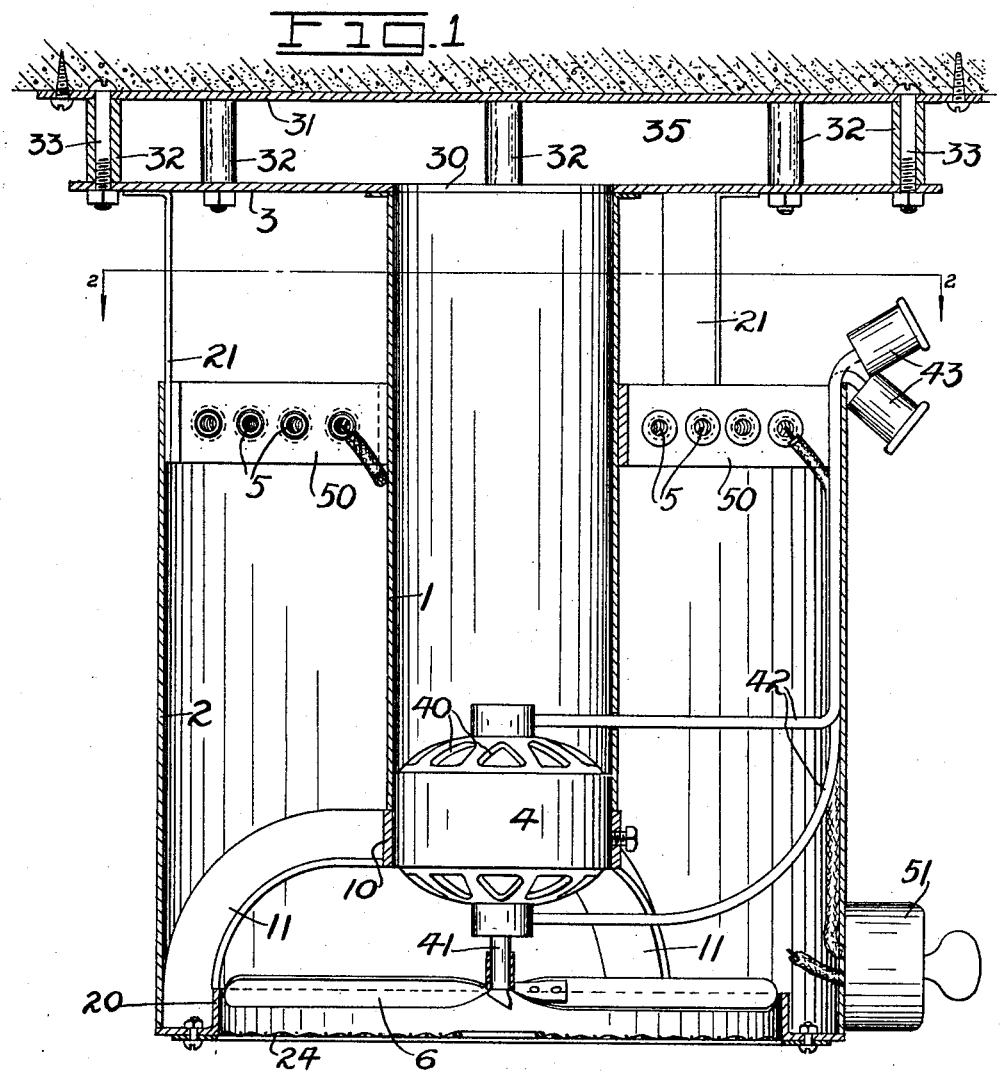
Inventor
Sydney N. Coates
By Reynolds & Reynolds
Attorneys Feb. 25, 1930. S. N. COATES 1,748,208
DOWN DRAFT HEATER
Filed Nov. 7, 1928   2 Sheets-Sheet 2
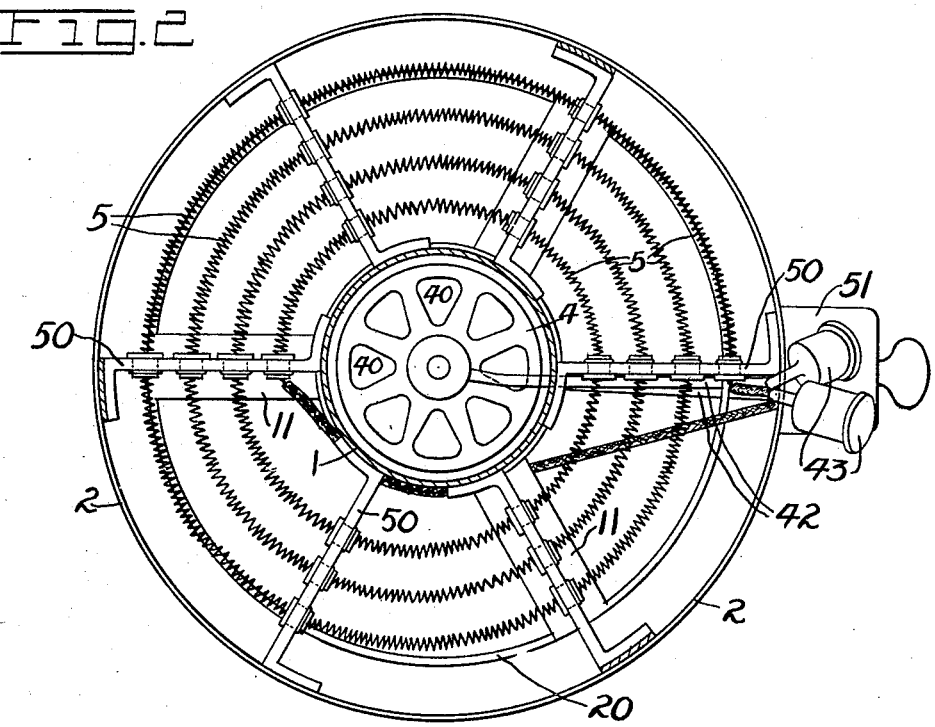
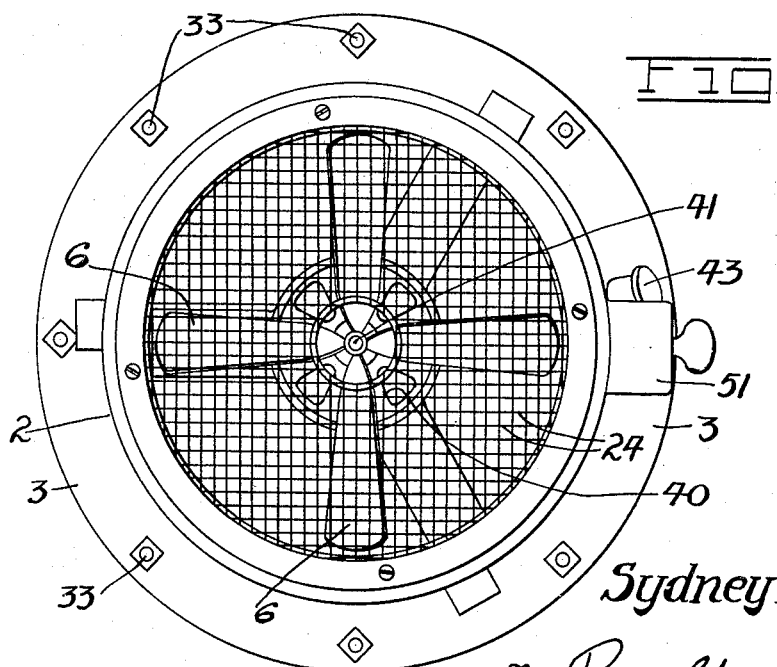
Inventor
Sydney N. Coates
By Reynolds & Reynolds
Attorneys Patented Feb. 25, 1930

1,748,208

UNITED STATES PATENT OFFICE

SYDNEY N. COATES, OF SEATTLE, WASHINGTON

DOWN-DRAFT HEATER

Application filed November 7, 1928. Serial No. 317,722.

My invention relates to an improvement in heaters, and while it is intended chiefly as a downdraft heater to be attached in or to the ceiling of a room, it may with facility be employed in a horizontal direction, or even inverted.

It is my object to provide a heater wherein a fan positively draws air through a heating element, and discharges the heated air into the room, and to provide in association with such a heater a means operable by the fan itself for cooling and ventilating the motor, and to provide means for protecting the motor, not only against heat delivered thereto by convection and conduction, but from radiated heat as well.

It is a further object to provide such a heater which is simply and cheaply constructed, and thoroughly efficient in operation.

My invention comprises the novel parts, and the novel combinations and arrangements thereof, as shown in the accompanying drawings, described in the specification, and as will be more particularly pointed out by the claims which terminate the same.

In the accompanying drawings I have shown my invention in a form which is now preferred by me, it being understood that differences in the form and arrangement of parts may be accomplished within the scope of my invention without alteration of the principle thereof.

Figure 1 is an axial section through the preferred form of my heater.

Figure 2 is a transverse section, substantially on the line 2—2 of Figure 1.

Figure 3 is a bottom plan view of my invention.

Figure 4 is a detail section of the upper portion of a slightly modified form of the heater.

Essentially the invention comprises two conduits which terminate at a common discharge opening, and which are connected at their opposite ends to a source of air supply, either outside air or the air within the room itself, in one of these conduits a heater or heating element being located, through which the air may be drawn, and in the other conduit a motor, which is thereby cooled by the fresh, cool draft drawn through this conduit by a fan, so positioned as to draw air through both conduits, and through the motor in the one conduit. It is not essential that the two conduits be one within the other throughout their length, as is shown in the drawings, though for cheapness of construction and compactness this is desirable, yet the arrangement of parts is such, when the conduits are so disposed, as to protect the motor cool as against radiated or conducted heat, as well as the heated air.

According to my invention, then, an inner conduit 1 is received within an outer conduit 2, with their discharge ends, which in this case are the lower ends, adjacent one another so as to form in effect a common discharge outlet. This outlet for the conduit 2 may be defined by a flanged ring 20, over the open end of which may be stretched a protective screen 41. The discharge outlet of the conduit 1 may be defined by a ring 10 supported on a spider 11, carried by the flanged ring 20, or in any other suitable manner supported from the same support which carries the conduit 2.

At the upper end of the conduit a suitable support may be arranged. For instance, brackets 21 may support the outer conduit 2, these being connected to the ceiling, or to members supported from the ceiling. Such a member may be the plate 3, and the brackets 21, in the form shown, space the upper or inlet end of the conduit 2 from the plate 3, which plate covers the upper end of the conduit 2. The inner conduit 1 is extended upward, in this form, to the level of the plate 3, and this plate has an aperture 30, communicating with the inlet end of the conduit 1. Or, as shown in Figure 4, the inner conduit 1 may terminate at about the same level as the upper end of the conduit 2, and air for the inner conduit 1, in this case, is drawn through the space between the upper edge of the conduit 2 and the plate 3.

The plate 3 may conveniently be suspended from and spaced from a second plate 31, as by means of spacer sleeves 32 and bolts 33, the plate 31 being continuous and being suitably secured to the ceiling. Thus there is provided an air space 35, in the preferred form, by means of which air for the conduit 1, and intended to ventilate a motor 4, supported within the conduit 1, is or may be drawn from a source independent of the source of air for the conduit 2. As another means of support, the heater may be set into a wall or ceiling, the ring 20 flush with and secured in the surface thereof. The space 35 or the conduit 1 may communicate with a separate or outside air source, or may still receive air from the room to be heated.

The motor 4 preferably is supported in the ring 10, and in effect closes the discharge end of the conduit 1. It is provided with the usual ventilating openings 40 in the end bells, and is arranged with its shaft 41 vertical, that is, coaxial with the conduit 1. Thus, air, passing through the conduit 1, may pass through the motor 4 and cool it, and this is of great advantage, not only because of the proximity of heating elements 5 supported in the conduit 2, but because the steady running of the motor will tend to heat it, and it may thus be effectively kept cool.

To draw the air through the conduits 1 and 2, a single fan 6 may be employed, this being connected to the motor 4 by some suitable means, as for example by being secured directly to the projecting shaft 41 of the motor. This is protected by the screen 21, and this fan 6 is so positioned as to draw air not only through the conduit 2, but through the conduit 1.

The heating elements 5 may consist of the usual coils of resistance wire supported in bridges 50, which, as shown, are of Z-shape, and supported between the conduits 2 and 1, and connected to a suitable control switch at 51. Preferably, these are located at the upper or inlet end of the conduit 2, whereas the motor is at the discharge end of the conduit 1, spaced as far as possible from the heating elements 5. In this manner, not only is the effect of convection guarded against by the spacing between the heating elements and motor, which will be cooled by the incoming air through the conduit 1, but this spacing of the heating elements and motor, and the guarding of the motor by the conduit 1, further guards against the effect of radiated heat on the motor.

To lubricate the motor I may provide lubricating conduits or tubes 42, extending from grease cups 43. These grease conduits are exposed to the heated incoming air in the conduit 2, and the solid grease will ordinarily turn fluid, and is conveyed to the motor bearings by wicking or any other suitable means.

What I claim as my invention is:

1. A heater comprising two conduits, each open at one end to a source of air supply, and having a common discharge at the other end, a fan located at the common discharge to draw air through both conduits, a heating element in one conduit, and a motor in the other conduit, operatively connected to the fan.

2. A heater comprising two conduits terminating, one within the other, at a common discharge opening, and each connected at its other end to a source of air supply, a fan located within the discharge end of the outer conduit to draw air through both conduits, means for heating the air drawn through said outer conduit, and a motor in the inner conduit, and operatively connected to the fan.

3. A heater comprising two conduits, one within the other, and terminating at one end within the other, and terminating at one end in a common discharge outlet, said conduits being each open at their opposite ends to a source of air supply, a motor within the inner conduit, a heating element within the outer conduit, and a fan connected to said motor and adapted to draw air through both conduits.

4. A heater comprising two conduits, one within the other, and terminating at one end in a common discharge outlet, said conduits being each open at their opposite ends to a source of air supply, a motor within and closing the discharge end of the inner conduit, whereby air drawn therethrough must pass through the motor, a heating element within the outer casing, near its inlet, and a fan connected to said motor and disposed to draw air through both conduits.

5. A heater comprising two conduits, one within the other, and terminating at one end in adjacent discharge outlets, a plate covering but spaced from the other end of the outer conduit, to form an air inlet thereto, said inner conduit extending from the discharge outlet to and through said plate, to have an independent air inlet, means for heating the air which passes through said outer conduit, a motor in said inner conduit, and a fan operatively connected to said motor and disposed to draw air through both conduits.

6. A heater comprising two conduits, one within the other, and terminating at one end in adjacent discharge outlets, a plate covering but spaced from the other end of the outer conduit, to form an air inlet thereto, said inner conduit extending from the discharge outlet to and through said plate, to have an independent air inlet, a heating element in said outer conduit, a motor in said inner conduit, and a fan operatively connected to said motor and disposed to draw air through both conduits.

7. A heater comprising two conduits, one within the other, and terminating at one end in adjacent discharge outlets, a plate covering but spaced from the other end of the outer conduit, to form an air inlet thereto, said inner conduit extending from the discharge outlet to and through said plate, to have an independent air inlet, a heating element in said outer conduit, a motor in said inner conduit, a fan operatively connected to said motor and disposed to draw air through both conduits, and a second plate spaced from said first plate, and substantially coextensive therewith.

Signed at Seattle, Washington, this 31st day of October, 1928.

SYDNEY N. COATES.